US012646803B2

(12) United States Patent
Sato et al.

(10) Patent No.: US 12,646,803 B2
(45) Date of Patent: Jun. 2, 2026

(54) SEPARATOR FOR NON-AQUEOUS SECONDARY BATTERY AND NON-AQUEOUS SECONDARY BATTERY

(71) Applicant: TEIJIN LIMITED, Osaka (JP)

(72) Inventors: Megumi Sato, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 647 days.

(21) Appl. No.: 18/006,981

(22) PCT Filed: Jul. 29, 2021

(86) PCT No.: PCT/JP2021/028203
§ 371 (c)(1),
(2) Date: Jan. 26, 2023

(87) PCT Pub. No.: WO2022/025215
PCT Pub. Date: Feb. 3, 2022

(65) Prior Publication Data
US 2023/0275320 A1     Aug. 31, 2023

(30) Foreign Application Priority Data

Jul. 31, 2020     (JP) ................................. 2020-130639

(51) Int. Cl.
*H01M 50/423*     (2021.01)
*H01M 50/42*      (2021.01)
*H01M 50/446*     (2021.01)
*H01M 50/449*     (2021.01)
*H01M 50/489*     (2021.01)
*H01M 50/491*     (2021.01)

(52) U.S. Cl.
CPC ......... *H01M 50/446* (2021.01); *H01M 50/42* (2021.01); *H01M 50/423* (2021.01); *H01M 50/449* (2021.01); *H01M 50/489* (2021.01); *H01M 50/491* (2021.01)

(58) Field of Classification Search
CPC ............. H01M 50/423; H01M 50/446; H01M 50/449; H01M 50/451; H01M 50/489
See application file for complete search history.

(56) References Cited

U.S. PATENT DOCUMENTS

| | | | |
|---|---|---|---|
| 2006/0055075 A1* | 3/2006 | Hoshida | B29C 55/005 264/211 |
| 2009/0208841 A1 | 8/2009 | Naruse | |
| 2014/0030606 A1 | 1/2014 | Kojima et al. | |
| 2014/0302389 A1 | 10/2014 | Hasegawa et al. | |
| 2016/0043370 A1 | 2/2016 | Hatta et al. | |
| 2017/0294638 A1 | 10/2017 | Joo et al. | |
| 2018/0212220 A1 | 7/2018 | Kuratani et al. | |
| 2018/0233726 A1 | 8/2018 | Nagao | |
| 2019/0020007 A1 | 1/2019 | Hasegawa et al. | |
| 2019/0305279 A1 | 10/2019 | Takamatsu | |
| 2019/0319243 A1 | 10/2019 | Yi et al. | |
| 2020/0006734 A1* | 1/2020 | Murakami | H01M 50/491 |
| 2020/0343511 A1 | 10/2020 | Nagao et al. | |
| 2022/0149483 A1 | 5/2022 | Sato et al. | |

FOREIGN PATENT DOCUMENTS

| | | | |
|---|---|---|---|
| CN | 106415886 A | 2/2017 | |
| CN | 108448033 A | 8/2018 | |
| EP | 3 885 126 A1 | 9/2021 | |
| JP | 2011-110704 A | 6/2011 | |
| JP | 2011-210435 A | 10/2011 | |
| JP | 2012-119224 A | 6/2012 | |
| JP | 5429811 B2 | 2/2014 | |
| JP | 2017-191775 A | 10/2017 | |
| JP | 6526359 B1 | 6/2019 | |
| JP | 2019-216033 A | 12/2019 | |
| KR | 10-2017-0027715 A | 3/2017 | |
| WO | WO-2012005152 A1 * | 1/2012 | ......... H01M 50/446 |
| WO | 2013/073362 A1 | 5/2013 | |
| WO | 2014/148036 A1 | 9/2014 | |
| WO | 2017/038551 A1 | 3/2017 | |
| WO | 2019/146155 A1 | 8/2019 | |
| WO | 2020/105673 A1 | 5/2020 | |

OTHER PUBLICATIONS

International Search Report for PCT/JP2021/028203 dated Sep. 28, 2021.

* cited by examiner

*Primary Examiner* — Kevin E Yoon

(74) *Attorney, Agent, or Firm* — Sughrue Mion, PLLC

(57)     ABSTRACT

Provided is a separator for a non-aqueous secondary battery, the separator contains a porous substrate, and a heat resistant porous layer that is provided on one side or on both sides of the porous substrate, and that contains a heat resistant resin and barium sulfate particles, in which an average primary particle size of the barium sulfate particles contained in the heat resistant porous layer is from 0.01 μm to less than 0.30 μm, and in which a volume ratio of the barium sulfate particles in a solid content portion of the heat resistant porous layer is from 5% by volume to less than 30% by volume.

10 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2021/028203 filed Jul. 29, 2021, claiming priority based on Japanese Patent Application No. 2020-130639 filed Jul. 31, 2020.

TECHNICAL FIELD

The disclosure relates to a separator for a non-aqueous secondary battery and a non-aqueous secondary battery.

BACKGROUND ART

A separator which is one of members constituting a non-aqueous secondary battery requires such heat resistance that a film is not easily broken or shrunk even when the temperature inside the battery is high in order to ensure safety of the battery. As a separator having improved heat resistance, a separator including a porous layer containing a heat resistant resin and/or inorganic particles on a porous substrate is known.

For example, Japanese Patent No. 5429811 or International Publication No. WO 2014/148036 discloses a separator including a porous layer containing barium sulfate particles provided on a porous substrate.

For example, Japanese Patent Application Laid-Open (JP-A) No. 2012-119224 or Japanese Patent Application Laid-Open (JP-A) No. 2019-216033 discloses a separator including a porous layer containing a resin such as a wholly aromatic polyamide and inorganic particles provided on a porous substrate.

For example, Japanese Patent No. 6526359 discloses a separator including a porous layer containing a resin such as a wholly aromatic polyamide, and barium sulfate particles provided on a porous substrate.

SUMMARY OF INVENTION

Technical Problem

In order to ensure the safety of the battery, the separator is required to have adhesiveness that makes the separator be difficult to peel off from the electrode even when the separator receives an impact from the outside or the electrode expands and contracts due to charging and discharging. In order to ensure the adhesiveness of the separator to the electrode, in addition to the adhesiveness of the surface of the separator to the electrode, it is also necessary that each layer constituting the separator be hardly peeled from each other. It is also important that each layer constituting the separator be less likely to be peeled from each other from the viewpoint of increasing the production yield of the battery.

The embodiment of the disclosure has been made under the above circumstances.

An object of an embodiment of the disclosure is to provide a separator for a non-aqueous secondary battery including a heat resistant porous layer on a porous substrate, the separator having excellent heat resistance and having a heat resistant porous layer that is less likely to peel off from the porous substrate.

Solution to Problem

The specific solutions to the problem include the following embodiments:

<1> A separator for a non-aqueous secondary battery, the separator containing:

a porous substrate; and a heat resistant porous layer that is provided on one side or on both sides of the porous substrate, and that contains a heat resistant resin and barium sulfate particles, wherein an average primary particle size of the barium sulfate particles contained in the heat resistant porous layer is from 0.01 μm to less than 0.30 μm, and wherein a volume ratio of the barium sulfate particles in a solid content portion of the heat resistant porous layer is from 5% by volume to less than 30% by volume.

<2> The separator for a non-aqueous secondary battery according to <1>, wherein the volume ratio of the barium sulfate particles in the solid content portion of the heat resistant porous layer is from 5% by volume to less than 27% by volume.

<3> The separator for a non-aqueous secondary battery according to <1> or <2>, wherein the heat resistant resin contains at least one selected from the group consisting of wholly aromatic polyamide, polyamide imide, poly-N-vinylacetamide, polyacrylamide, copolymerized polyether polyamide, polyimide and polyether imide.

<4> The separator for a non-aqueous secondary battery according to any one of <1> to <3>, wherein a peeling strength between the porous substrate and the heat resistant porous layer is 0.30 N/12 mm or more.

<5> The separator for a non-aqueous secondary battery according to any one of <1> to <4>, wherein an area shrinkage ratio of the separator for the non-aqueous secondary battery, when heated at 135° C. for 1 hour, is 30% or less.

<6> The separator for a non-aqueous secondary battery according to any one of <1> to <5>, wherein an area shrinkage ratio of the separator for the non-aqueous secondary battery, when heated at 150° C. for 1 hour, is 45% or less.

<7> The separator for a non-aqueous secondary battery according to any one of <1> to <6>, wherein a porosity of the heat resistant porous layer is from 30% to 70%.

<8> The separator for a non-aqueous secondary battery according to any one of <1> to <7>, wherein a weight per unit area of the heat resistant porous layer as a total of both sides is from 1.0 g/m² to 30.0 g/m².

<9> The separator for a non-aqueous secondary battery according to any one of <1> to <8>, wherein the separator for a non-aqueous secondary battery further comprises an adhesive layer, as an outermost layer, on one side or on both sides of the separator.

<10> A non-aqueous secondary battery that obtains electromotive force by lithium doping and dedoping, the non-aqueous secondary battery containing:

a positive electrode;

a negative electrode; and the separator for a non-aqueous secondary battery according to any one of <1> to <9>, the separator being disposed between the positive electrode and the negative electrode.

Advantageous Effects of Invention

According to the disclosure, there is provided a separator for a non-aqueous secondary battery including a heat resistant porous layer on a porous substrate, the separator having excellent heat resistance and having a heat resistant porous layer that is less likely to peel off from the porous substrate.

DESCRIPTION OF EMBODIMENTS

Hereinafter, the embodiments will be described. Further, the description and the Examples thereof illustrate the embodiments, but do not limit the scope of the embodiments.

In the disclosure, the numerical range denoted by using "to" represents the range inclusive of the number written before and after "to" as the minimum and maximum values.

Regarding stepwise numerical ranges designated in the disclosure, an upper or lower limit set forth in a certain numerical range may be replaced by an upper or lower limit of another stepwise numerical range described. Besides, an upper or lower limit set forth in a certain numerical range of the numerical ranges designated in the disclosure may be replaced by a value indicated in Examples.

In the disclosure, the term "process" includes not only an independent process, but also the process which is not clearly distinguished from other processes but achieves the desired purpose thereof.

In the disclosure, when the amount of each component in a composition is referred to and when a plurality of substances corresponding to each component are present in the composition, the total amount of the plurality of components present in the composition is meant unless otherwise specified.

A plurality of kinds of particles corresponding to each component in the disclosure may be contained. When there are a plurality of kinds of particles corresponding to each component in a composition, a particle diameter of each component means a value for a mixture of the plurality of kinds of particles present in the composition unless otherwise specified.

In the disclosure, "MD (machine direction)" refers to the longitudinal direction of a porous substrate and a separator manufactured in a long shape, and "TD (transverse direction)" refers to a direction orthogonal to "MD direction" in a surface direction of the porous substrate and a separator. In the disclosure, "TD" also refers to a width direction.

In the disclosure, in a case where a lamination relationship among layers constituting a separator is expressed as "upper" and "lower", a layer closer to a porous substrate is referred to as "lower", and a layer farther from the porous substrate is referred to as "upper".

<Separator for Non-aqueous Secondary Battery>

A separator for a non-aqueous secondary battery (also referred to as "separator") of the disclosure includes a porous substrate and a heat resistant porous layer provided on one side or on both sides of the porous substrate.

In the separator of the disclosure, the heat resistant porous layer contains a heat resistant resin and barium sulfate particles, in which an average primary particle size of the barium sulfate particles contained in the heat resistant porous layer is from 0.01 μm to less than 0.30 μm, and in which a volume ratio of the barium sulfate particles in a solid content portion of the heat resistant porous layer is from 5% by volume to less than 30% by volume.

In the disclosure, a heat resistant resin refers to a resin having a melting point of 200° C. or higher, or a resin having no melting point and having a decomposition temperature of 200° C. or higher. That is, the heat resistant resin in the disclosure is a resin that is not melted or decomposed in a temperature range of lower than 200° C.

The average primary particle size of the barium sulfate particles contained in the heat resistant porous layer is less than 0.30 μm from the viewpoint of increasing heat resistance of the heat resistant porous layer. When the average primary particle size of the barium sulfate particles is less than 0.30 the heat resistance of the heat resistant porous layer increases. A mechanism for this is considered as follows. That is, the small particle sizes of the barium sulfate particles increase the surface area of the barium sulfate particles per unit volume (specific surface area), and therefore the number of contact points between the barium sulfate particles and the heat resistant resin increases. Therefore, shrinkage of the heat resistant porous layer when being exposed to a high temperature is considered to be suppressed. In addition, it is presumed that a large number of barium sulfate particles having small particle sizes are connected to each other, and therefore the heat resistant porous layer is hardly contracted when being exposed to a high temperature.

The average primary particle size of the barium sulfate particles contained in the heat resistant porous layer is 0.01 μm or more from the viewpoint of suppressing aggregation of the particles to form a highly uniform heat resistant porous layer.

In the separator of the disclosure, the volume ratio of the barium sulfate particles in the solid content portion of the heat resistant porous layer is 5% by volume or more from the viewpoint of obtaining the heat resistant function of the barium sulfate particles.

In the separator of the disclosure, the volume ratio of the barium sulfate particles in the solid content portion of the heat resistant porous layer is less than 30% by volume from the viewpoint that the heat resistant porous layer is hardly peeled off from the porous substrate. When the content of the barium sulfate particles having a small particle size of less than 0.30 μm in average primary particle size is large, the surface of the heat resistant porous layer becomes flat, and the heat resistant porous layer is easily peeled off from the porous substrate. In order to suppress this event, the volume ratio of the barium sulfate particles in the solid content portion of the heat resistant porous layer is less than 30% by volume.

By the synergistic action of the above configurations, the separator of the disclosure has excellent heat resistance and the heat resistant porous layer that is hardly peeled off from the porous substrate.

Hereinafter, the details of the porous substrate and the heat resistant porous layer included in the separator of the disclosure will be described.

[Porous Substrate]

The porous substrate in the disclosure refers to a substrate having pores or voids therein. As the substrate, a microporous film; a porous sheet such as non-woven fabric and paper, composed of a fibrous material; a composite porous sheet in which on a microporous film or a porous sheet, one or more of another porous layer are laminated; and the like may be listed. In the disclosure, a microporous film is preferable from the viewpoint of thinning and strength of a separator. The microporous film refers to a film having plural micropores therein, having a structure in which these micropores are connected to each other, and allowing gas or liquid to pass from one side to the other side.

As the material for the porous substrate, materials having electrical insulation are preferably used and any of organic materials and inorganic materials may be used.

It is preferred that the porous substrate contains a thermoplastic resin, from the viewpoint of imparting a shutdown function to the porous substrate. The shutdown function refers to a function of dissolving the constituent material to clog the pores of the porous substrate, thereby blocking ionic migration, and preventing thermal runaway of a battery, when the battery temperature is raised. As the thermoplastic resin, a thermoplastic resin having a melting point less than 200° C. is preferred. As the thermoplastic resin, for example, polyesters such as polyethylene terephthalate; polyolefins such as polyethylene and polypropylene; and the like may be mentioned, and among them, polyolefins are preferred.

As the porous substrate, a microporous film containing polyolefin (referred to as "polyolefin microporous film") is preferred. As the polyolefin microporous film, for example, a polyolefin microporous film which is applied to the conventional separator for a battery may be mentioned, and among them, it is preferred to select those having sufficient mechanical properties and ion permeability.

It is preferred that the polyolefin microporous film contains polyethylene, from the viewpoint of exhibiting the shutdown function, and the content of polyethylene is preferably 95% by mass or more with respect to the total mass of the polyolefin microporous film.

It is preferred that the microporous film contains polypropylene, from the viewpoint of imparting heat resistance to the extent that the film is not easily broken when exposed to a high temperature.

It is preferred that the polyolefin microporous film contains polyethylene and polypropylene, from the viewpoint of imparting shutdown function and heat resistance that the film is not easily broken when exposed to a high temperature. As the polyolefin microporous film containing polyethylene and polypropylene, a microporous film in which polyethylene and polypropylene are present in a mixed state in a layer may be mentioned. It is preferred that the microporous film contains 95% by mass or more of polyethylene and 5% by mass or less of polypropylene, from the viewpoint of compatibility of the shutdown function and heat resistance. In addition, from the viewpoint of compatibility of the shutdown function and heat resistance, a polyolefin microporous film having a lamination structure with two or more layers, in which at least one layer contains polyethylene and at least one layer contains polypropylene, is also preferred.

As the polyolefin contained in the polyolefin microporous film, a polyolefin having a weight-average molecular weight (Mw) of from 100,000 to 5,000,000 is preferred. In the case that the polyolefin has a Mw of 100,000 or more, sufficient mechanical properties may be provided to the microporous film. Meanwhile, the polyolefin has a Mw of 5,000,000 or less, the shutdown characteristic of the microporous film is good, and film molding of the microporous film is easy.

Examples of the method for manufacturing the polyolefin microporous film include, a method containing extruding a molten polyolefin resin from a T-die to form a sheet, crystallizing and elongating the sheet, and further subjecting the sheet to heat treatment, thereby obtaining a microporous film; and a method containing extruding a polyolefin resin melted with a plasticizer such as liquid paraffin from a T-die, cooling it to form a sheet, elongating the sheet, extracting the plasticizer, and performing heat treatment, thereby obtaining a microporous film.

As the porous sheet composed of a fibrous material, non-woven fabric composed of fibrous materials such as polyesters such as polyethylene terephthalate; polyolefins such as polyethylene and polypropylene; heat resistant resins such as wholly aromatic polyamide, polyamideimide, polyimide, polyethersulfone, polysulfone, polyetherketone, and polyetherimide; cellulose; and the like, or paper may be mentioned.

Examples of the composite porous sheet include a sheet in which a functional layer is stacked on a porous sheet made of a microporous film or a fibrous material. Such a composite porous sheet is preferable from the viewpoint that a function can be further added thereto with a functional layer. Examples of the functional layer include a porous layer made of a heat resistant resin and a porous layer made of a heat resistant resin and an inorganic filler from the viewpoint of imparting heat resistance. Examples of the heat resistant resin include one or more heat resistant resins selected from wholly aromatic polyamide, polyamideimide, polyimide, polyethersulfone, polysulfone, polyetherketone, or polyetherimide. Examples of the inorganic filler include a metal oxide such as alumina, and a metal hydroxide such as magnesium hydroxide. Examples of a method of forming a composite include a method of applying a functional layer to a microporous film or a porous sheet, a method of bonding a microporous film or a porous sheet and a functional layer with an adhesive, and a method of thermally press-bonding a microporous film or a porous sheet with a functional layer.

The surface of the porous substrate may be subjected to various surface treatments within the range of not impairing the nature of the porous substrate, for the purpose of improving wettability with the coating liquid for forming the heat resistant porous layer. As the surface treatment, corona treatment, plasma treatment, flame treatment, UV irradiation treatment, and the like may be mentioned.

[Characteristics of Porous Substrate]

The thickness of the porous substrate is preferably 18 μm or less, more preferably 15 μm or less, and still more preferably 12 μm or less, from the viewpoint of enhancing energy density of the battery, and is preferably 4 μm or more, more preferably 6 μm or more, and still more preferably 8 μm or more, from the viewpoint of production yield of the separator and production yield of the battery.

The Gurley value of the porous substrate (JIS P8117: 2009) is preferably from 40 sec/100 ml to 300 sec/100 ml, more preferably from 50 sec/100 ml to 200 sec/100 ml from the viewpoint of the balance between ion permeability and suppression of battery short circuit.

The porous substrate preferably has a porosity of from 20% to 60% from the viewpoint of obtaining an appropriate film resistance and a shutdown function. The porosity $\varepsilon$ (%) of the porous substrate is determined by the following formula.

$$\varepsilon = \{1 - Ws/(ds \cdot t)\} \times 100$$

Here, Ws represents basis weight of porous substrate $(g/m^2)$, ds represents true density of porous substrate $(g/cm^3)$, and t represents thickness (μm) of porous substrate. The basis weight refers to mass per unit area.

The porous substrate preferably has an average pore size of from 20 nm to 100 nm from the viewpoint of ion permeability or suppression of battery short circuit. The average pore size of the porous substrate is measured using a palm porometer (CFP-1500-A manufactured by PMI) according to ASTM E1294-89.

The piercing strength of the porous substrate is preferably 150 gf or more, and more preferably 200 gf or more, from the viewpoint of production yield of the separator and production yield of the battery. The piercing strength of the porous substrate is measured by performing a piercing test under the condition of a curvature radius of a needle tip of 0.5 mm, and a piercing speed of 2 mm/sec, using a KES-G5 handy compression tester from KATO TECH CO., LTD., to obtain a maximum piercing strength (gf).

[Heat Resistant Porous Layer]

The heat resistant porous layer is a layer having a large number of micropores therein, having a structure in which these micropores are connected to each other, and allowing gas or liquid to pass from one surface to the other surface.

In the separator of the disclosure, the heat resistant porous layer may be provided only on one side of the porous substrate, or may be provided on both sides of the porous substrate. When the heat resistant porous layers are provided on both sides of the porous substrate, the heat resistance of the separator is better, and the safety of a battery can be further improved. In addition, the separator is less likely to be curled, and has excellent handleability during production of a battery. When the heat resistant porous layer is provided only on one side of the porous substrate, the separator has better ion permeability. In addition, the thickness of the entire separator can be suppressed, and a battery having a higher energy density can be produced.

The heat resistant porous layer contains at least a heat resistant resin and barium sulfate particles. The heat resistant porous layer may contain a resin other than the heat resistant resin. The heat resistant porous layer may contain other inorganic particles other than barium sulfate particles. The heat resistant porous layer may contain an organic filler.

—Heat Resistant Resin—

The type of heat resistant resin is not limited as long as the heat resistant resin is a resin that is not melted or decomposed in a temperature range of lower than 200° C. Examples of the heat resistant resin include wholly aromatic polyamide, polyamideimide, poly-N-vinylacetamide, poly-acrylamide, copolymerized polyetherpolyamide, polyimide, polyetherimide, and the like. The heat resistant resins may be used alone or in combination of two or more kinds thereof.

Among the heat resistant resins, the wholly aromatic polyamides are preferable from the viewpoint of durability. The wholly aromatic polyamide means a polyamide having a main chain composed only of a benzene ring and an amide bond. However, the wholly aromatic polyamide may be copolymerized with a small amount of an aliphatic monomer. The wholly aromatic polyamide is also called aramid.

The wholly aromatic polyamide may be meta-type or para-type. Among the wholly aromatic polyamides, the meta-wholly aromatic polyamide is preferable from the viewpoint of easily forming a porous layer and excellent oxidation reduction resistance in the electrode reaction. Specifically, the wholly aromatic polyamide is preferably polymetaphenylene isophthalamide, copolyparaphenylene 3,4' oxydiphenylene terephthalamide, or polyparaphenylene terephthalamide, and more preferably polymetaphenylene isophthalamide as the meta-wholly aromatic polyamide.

In addition, a para-wholly aromatic polyamide is preferable from the viewpoint of excellent heat resistance at a higher temperature. As the para-wholly aromatic polyamide, copolyparaphenylene 3,4' oxydiphenylene terephthalamide is preferable. The heat resistance of the heat resistant resin can be evaluated by, for example, a spot heating test in the presence of an electrolytic solution.

When the heat resistant porous layer is provided on both sides of the porous substrate, the type of the heat resistant resin contained in one heat resistant porous layer and the type of the heat resistant resin contained in the other heat resistant porous layer may be the same or different.

The content of the heat resistant resin contained in the heat resistant porous layer is preferably 85% by mass to 100% by mass, more preferably 90% by mass to 100% by mass, and still more preferably 95% by mass to 100% by mass based on the total amount of resin contained in the heat resistant porous layer.

—Other Resins—

The heat resistant porous layer may contain a resin other than the heat resistant resin, that is, a resin that is melted or decomposed in a temperature range of lower than 200° C. Examples of other resins include polyvinylidene fluoride type resin, an acrylic type resin, a fluorine-based rubber, a styrene-butadiene copolymer, a homopolymer or a copolymer of vinyl nitrile compounds (acrylonitrile, methacrylonitrile, and the like), carboxymethyl cellulose, hydroxyalkyl cellulose, polyvinyl alcohol, polyvinyl butyral, polyvinyl pyrrolidone, polyethers (polyethylene oxide, polypropylene oxide, and the like), polysulfone, polyketone, polyether ketone, polyethersulfone, a mixture thereof, and the like.

The type and content of other resins can be selected from the viewpoints of improvement of adhesiveness of the heat resistant porous layer to the electrode, a function of binding barium sulfate particles, moldability of the heat resistant porous layer, and the like.

The content of other resins contained in the heat resistant porous layer is preferably 0% by mass to 15% by mass, more preferably 0% by mass to 10% by mass, and still more preferably 0% by mass to 5% by mass based on the total amount of resin contained in the heat resistant porous layer.

—Barium Sulfate Particles—

Barium sulfate is less likely to decompose an electrolytic solution or an electrolyte, and thus less likely to cause gas generation. Therefore, by using the barium sulfate particles as the inorganic filler of the heat resistant porous layer, it is possible to obtain a separator that hardly generates gas and hardly causes swelling and deformation of the battery.

The barium sulfate particles may be barium sulfate particles surface-modified with a silane coupling agent or the like.

The particle shape of the barium sulfate particles is not limited, and may be spherical, plate-like, needle-like, or amorphous. The barium sulfate particles are preferably spherical or plate-like particles from the viewpoint of suppressing short circuit of the battery or from the viewpoint of forming a highly uniform heat resistant porous layer.

The average primary particle size of the barium sulfate particles contained in the heat resistant porous layer is less than 0.30 preferably 0.28 μm or less, and more preferably 0.27 μm or less, from the viewpoint of increasing the heat resistance of the heat resistant porous layer. The average primary particle size of the barium sulfate particles contained in the heat resistant porous layer is 0.01 μm or more, preferably 0.03 μm or more, and more preferably 0.04 μm or more from the viewpoint of suppressing aggregation of the barium sulfate particles and forming a highly uniform heat resistant porous layer.

The average primary particle size of the barium sulfate particles is obtained by measuring major diameters of 100 barium sulfate particles randomly selected in observation with a scanning electron microscope (SEM), and averaging the major diameters of the 100 barium sulfate particles. Samples subjected to the SEM observation are barium sulfate particles, which are the material forming the heat resistant porous layer, or barium sulfate particles taken out from the heat resistant porous layer of the separator.

There is no limitation on the method of taking out the barium sulfate particles from the heat resistant porous layer of the separator Examples of the method includes a method in which the heat resistant porous layer peeled off from the separator is immersed in an organic solvent that dissolves the resin to dissolve the resin with the organic solvent and take out the barium sulfate particles; a method in which the heat resistant porous layer peeled off from the separator is heated to about 800° C. to disappear the resin and take out the barium sulfate particles, and the like.

When the heat resistant porous layer is provided on both sides of the porous substrate, the average primary particle size of the barium sulfate particles contained in one heat resistant porous layer and the average primary particle size of the barium sulfate particles contained in the other heat resistant porous layer may be the same or different.

The volume ratio of the barium sulfate particles in the solid content portion of the heat resistant porous layer is 5% by volume or more, preferably 8% by volume or more, more preferably 10% by volume or more, from the viewpoint of the heat resistance of the separator. The volume ratio of the barium sulfate particles in the solid content portion of the heat resistant porous layer is less than 30% by volume, preferably less than 27% by volume, and more preferably less than 24% by volume from the viewpoint that the heat resistant porous layer is hardly peeled off from the porous substrate.

The volume ratio Va (volume %) of the barium sulfate particles in the solid content portion of the heat resistant porous layer is obtained by the following formula.

$$Va = \{(Xa/Da)/(Xa/Da + Xb/db + Xc/Dc + \ldots + Xn/Dn)\} \times 100$$

Here, among the constituent materials of the heat resistant porous layer, the barium sulfate particles are a, the other constituent materials are b, c, . . . , and n, masses of each constituent material contained in the heat resistant porous layer having a predetermined area are $Xa$, $Xb$, $Xc$, . . . , and $Xn$ (g), and the true densities of the constituent materials are $Da$, $Db$, $Dc$, . . . , and $Dn$ (g/cm$^3$).

$Xa$ and the like substituted in the above formula are the mass (g) of the constituent material used for forming the heat resistant porous layer having a predetermined area or the mass (g) of the constituent material taken out from the heat resistant porous layer having a predetermined area.

$Da$ and the like substituted in the above formula are the true density (g/cm$^3$) of the constituent material used for formation of the heat resistant porous layer or the true density (g/cm$^3$) of the constituent material taken out from the heat resistant porous layer.

When the heat resistant porous layer is provided on both sides of the porous substrate, the volume ratio of the barium sulfate particles in the solid content portion of one heat resistant porous layer and the volume ratio of the barium sulfate particles in the solid content portion of the other heat resistant porous layer may be the same or different.

The content of the barium sulfate particles contained in the heat resistant porous layer is preferably 50% by volume to 100% by volume, more preferably 60% by volume to 100% by volume, and still more preferably 70% by volume to 100% by volume with respect to the total amount of the inorganic particles contained in the heat resistant porous layer.

—Other Inorganic Particles—

The heat resistant porous layer may contain other inorganic particles other than barium sulfate particles. Examples of other inorganic particles include metal sulphate particles such as strontium sulphate, calcium sulphate, calcium sulphate dihydrate, alumite, and jarosite; metal hydroxide particles such as magnesium hydroxide, aluminum hydroxide, calcium hydroxide, chromium hydroxide, zirconium hydroxide, cerium hydroxide, nickel hydroxide, and boron hydroxide; metal oxide particles such as magnesium oxide, alumina (Al$_2$O$_3$), boehmite (alumina monohydrate), titania (TiO$_2$), silica (SiO$_2$), zirconia (ZrO$_2$), barium titanate (BaTiO$_3$), and zinc oxide; metal carbonate particles such as calcium carbonate and magnesium carbonate; metal nitride particles such as magnesium nitride, aluminum nitride, calcium nitride, and titanium nitride; metal fluoride particles such as magnesium fluoride and calcium fluoride; clay mineral particles such as calcium silicate, calcium phosphate, apatite, and talc; and the like. The other inorganic particles are preferably metal hydroxide particles or metal oxide particles from the viewpoint of stability to an electrolytic solution and electrochemical stability. The other inorganic particles may be inorganic particles surface-modified with a silane coupling agent or the like. The other inorganic particles may be used singly or in combination of two or more kinds thereof.

When the heat resistant porous layer is provided on both sides of the porous substrate, the type of other inorganic particles contained in one heat resistant porous layer and the type of other inorganic particles contained in the other heat resistant porous layer may be the same or different.

The average primary particle size of the other inorganic particles is preferably 0.01 μm to 5 μm, more preferably 0.05 μm to 3 μm, and still more preferably 0.1 μm to 1 μm. The method of measuring an average primary particle size of other inorganic particles is the same as the method of measuring an average primary particle size of barium sulfate particles.

The particle shape of the other inorganic particles is not limited, and may be spherical, plate-like, needle-like, or amorphous. The other inorganic particles are preferably spherical or plate-like particles from the viewpoint of suppressing short circuit of the battery or from the viewpoint of forming a highly uniform heat resistant porous layer.

The content of the other inorganic particles contained in the heat resistant porous layer is preferably 0% by volume to 50% by volume, more preferably 0% by volume to 40% by volume, and still more preferably 0% by volume to 30% by volume with respect to the total amount of the inorganic particles contained in the heat resistant porous layer.

When the heat resistant porous layer is provided on both sides of the porous substrate, the volume ratio of the other inorganic particles in the solid content portion of one heat resistant porous layer and the volume ratio of the other inorganic particles in the solid content portion of the other heat resistant porous layer may be the same or different.

The volume ratio of the entire inorganic particles in the solid content portion of the heat resistant porous layer is preferably less than 50% by volume, more preferably less than 45% by volume, still more preferably less than 40% by volume, and still much more preferably less than 35% by volume from the viewpoint that the heat resistant porous layer is hardly peeled off from the porous substrate.

From the viewpoint of the heat resistance of the separator, the volume ratio of the total inorganic particles in the solid content portion of the heat resistant porous layer is preferably 5% by volume or more, more preferably 10% by volume or more, and still more preferably 15% by volume or more.

The volume ratio Va$_0$ (volume %) of the inorganic particles in the solid content portion of the heat resistant porous layer is obtained by the following formula.

$$Va_0 = \{(Xa_0/Da_0)/(Xa_0/Da_0 + Xb/db + Xc/Dc + \ldots + Xn/Dn)\} \times 100$$

Here, among the constituent materials of the heat resistant porous layer, the inorganic particles are $a_0$, the other constituent materials are b, c, . . . , and n, masses of respective constituent materials contained in the heat resistant porous layer having a predetermined area are $Xa_0$, Xb, Xc, . . . , and Xn (g), and the true densities of respective constituent materials are $Da_0$, Db, Dc, . . . , and Dn (g/cm$^3$).

$Xa_0$ and the like substituted in the above formula are the mass (g) of the constituent material used for forming the heat resistant porous layer having a predetermined area or the mass (g) of the constituent material taken out from the heat resistant porous layer having a predetermined area.

$Da_0$ and the like substituted in the above formula are the true density (g/cm$^3$) of the constituent material used for formation of the heat resistant porous layer or the true density (g/cm$^3$) of the constituent material taken out from the heat resistant porous layer.

—Organic Filler—

The heat resistant porous layer may contain an organic filler. Examples of the organic filler include particles of a crosslinked polymer such as crosslinked poly (meth)acrylic acid, crosslinked poly (meth)acrylate, crosslinked polystyrene, crosslinked polysilicone, crosslinked polydivinylbenzene, a styrene-divinylbenzene copolymer crosslinked product, a melamine resin, a phenol resin, or a benzoguanamine-formaldehyde condensate; and particles of a heat resistant polymer such as polysulfone, polyacrylonitrile, aramid, or polyacetal. These organic fillers may be used singly or in combination of two or more kinds thereof. In the disclosure, the notation of "(meth)acrylic" means "acrylic" or "methacrylic".

—Other Components—

The heat resistant porous layer may contain an additive, for example, a dispersant such as a surfactant, a wetting agent, an antifoaming agent, or a pH adjuster. The dispersant is added to a coating liquid for forming a heat resistant porous layer for the purpose of improving dispersibility, coatability, or storage stability. The wetting agent, the antifoaming agent, or the pH adjuster is added to a coating liquid for forming a heat resistant porous layer for the purpose of, for example, improving compatibility with the porous substrate, suppressing mixing of air into the coating liquid, or adjusting the pH.

[Characteristics of Heat Resistant Porous Layer]

The thickness of the heat resistant porous layer is preferably 0.5 μm or more on one side, more preferably 1.0 μm or more on one side, and still more preferably 1.5 μm or more on one side from the viewpoint of heat resistance or handleability of the separator, and is preferably 8.0 μm or less on one side, more preferably 6.0 μm or less on one side, and still more preferably 4.0 μm or less on one side from the viewpoint of ion permeability and energy density of a battery.

When the heat resistant porous layer is provided on both sides of the porous substrate, the thickness of the heat resistant porous layer is preferably 1.0 μm or more, more preferably 2.0 μm or more, still more preferably 3.0 μm or more, and preferably 16.0 μm or less, more preferably 12.0 μm or less, still more preferably 8.0 μm or less, further still more preferably 6.0 μm or less, as a total thickness thereof on both sides of the porous substrate.

When the heat resistant porous layer is provided on both sides of the porous substrate, the difference (μm) between the thickness of one heat resistant porous layer and the thickness of the other heat resistant porous layer is preferably as small as possible, and is preferably 20% or less of the total thickness (μm) of both surfaces.

The mass per unit area of the heat resistant porous layer is preferably 1.0 g/m$^2$ or more, more preferably 2.0 g/m$^2$ or more, still more preferably 3.0 g/m$^2$ or more as the total of both surfaces from the viewpoint of the heat resistance or handleability of the separator, and is preferably 30.0 g/m$^2$ or less, more preferably 20.0 g/m$^2$ or less, still more preferably 10.0 g/m$^2$ or less, and still much more preferably 6.0 g/m$^2$ or less as the total of both surfaces from the viewpoint of the ion permeability and the energy density of the battery, regardless of whether the heat resistant porous layer is provided on one side or both sides of the porous substrate.

When the heat resistant porous layer is provided on both sides of the porous substrate, the difference (g/m$^2$) between the mass per unit area of one heat resistant porous layer and the mass per unit area of the other heat resistant porous layer is preferably as small as possible from the viewpoint of suppressing curling of the separator or improving the cycle characteristics of the battery, and is preferably 20% or less of the total amount (g/m$^2$) of both surfaces.

The porosity of the heat resistant porous layer is preferably 30% or more, more preferably 35% or more, and still more preferably 40% or more, from the viewpoint of ion permeability, and is preferably 70% or less, more preferably 65% or less, still more preferably 60% or less from the viewpoint of mechanical strength and heat resistance of the heat resistant porous layer. The porosity ε (%) of the heat resistant porous layer is determined by the following formula.

$$\varepsilon=\{1-(Wa/da+Wb/db+Wc/dc+\ldots+Wn/dn)/t\}\times100$$

Here, the constituent materials of the heat resistant porous layer are represented by a, b, n, the mass per unit area of each constituent material is Wa, Wb, Wc, . . . , or Wn (g/cm$^2$), the true density of each constituent material is represented by da, db, dc, . . . , or do (g/cm$^3$), and the thickness of the heat resistant porous layer is represented by t (cm).

The average pore size of the heat resistant porous layer is preferably from 10 nm to 200 nm. In a case where the average pore size is 10 nm or more, when the heat resistant porous layer is impregnated with an electrolytic solution, the pores are hardly blocked even if a resin contained in the heat resistant porous layer swells. In a case where the average pore size is 200 nm or less, uniformity in ion transfer is high, and a battery has excellent cycle characteristics and load characteristics.

The average pore size (nm) of the heat resistant porous layer is calculated by the following formula, assuming that all pores are cylindrical.

$$d=4V/S$$

In the formula, d represents an average pore size (diameter) of the heat resistant porous layer, V represents a pore volume per square meter of the heat resistant porous layer, and S represents a pore surface area per square meter of the heat resistant porous layer.

The pore volume V per square meter of the heat resistant porous layer is calculated from the porosity of the heat resistant porous layer.

The pore surface area S per square meter of the heat resistant porous layer is determined by the following method.

First, a specific surface area (m$^2$/g) of the porous substrate and a specific surface area (m$^2$/g) of the separator are calculated from a nitrogen gas adsorption amount by applying a BET formula to a nitrogen gas adsorption method. These specific surface areas (m$^2$/g) are multiplied by basis weights (g/m$^2$) of the porous substrate and the separator, respectively, to calculate a pore surface area per square meter. Then, the pore surface area per square meter of the porous substrate is subtracted from the pore surface area per square meter of the separator to calculate the pore surface area S per square meter of the heat resistant porous layer. The basis weight refers to the mass per unit area.

The peel strength between the porous substrate and the heat resistant porous layer is preferably 0.3 N/12 mm or more, more preferably 0.40 N/12 mm, and still more preferably 0.50 N/12 mm from the viewpoint of the adhesive strength of the separator to an electrode. A higher peel strength between the porous substrate and the heat resistant porous layer is more preferable from the above viewpoint. However, the peel strength is usually 2.00 N/12 mm or less. In a case where the separator has heat resistant porous layers on both sides of the porous substrate, the peel strength between the porous substrate and each of the heat resistant porous layers is preferably in the above range on both sides of the porous substrate.

The peel strength (N/12 mm) between the porous substrate and the heat resistant porous layer is determined by a T-shaped peel test in which the separator is peeled off in the MD direction. The dimensions of the test piece are rectangular with MD 70 mm and TD 12 mm, and the tensile speed in the T-shape peeling test is 300 mm/min.

[Adhesive Layer]

The separator of the disclosure may further include other layers other than the porous substrate and the heat resistant porous layer. Examples of other layers include an adhesive layer. The adhesive layer is provided as an outermost layer of the separator, and is a layer that adheres to the electrode when the separator and the electrode are stacked and pressed or hot-pressed.

Examples of the material constituting the adhesive layer include a resin, an inorganic filler, and an organic filler. The form of the adhesive layer, for example, includes a porous layer which has a large number of fine pores therein and through which a gas or a liquid can pass from one surface to the other surface; porous coating with a large number of open micropores; and a layer in which a large number of particles are arranged in the plane direction, and gas or liquid can pass from one side to the other side due to the gaps between the particles.

Examples of the form of the resin constituting the adhesive layer include a fibrillar resin, a film-like resin, and a particulate resin. An inorganic filler or an organic filler may be connected by the resin of these forms and contained in the adhesive layer.

Examples of the resins constituting the adhesive layer include polyvinylidene fluoride type resin, an acrylic type resin, a fluorine-based rubber, a styrene-butadiene copolymer, a homopolymer or a copolymer of vinyl nitrile compounds (acrylonitrile, methacrylonitrile, and the like), carboxymethyl cellulose, hydroxyalkyl cellulose, polyvinyl alcohol, polyvinyl butyral, polyvinyl pyrrolidone, polyethers (polyethylene oxide, polypropylene oxide, and the like), polysulfone, polyketone, polyether ketone, polyethersulfone, a mixture thereof, and the like.

When the adhesive layer includes the inorganic filler, examples of the inorganic filler include metal sulphate particles such as barium sulphate, strontium sulphate, calcium sulphate, calcium sulphate dihydrate, alumite, and jarosite; metal hydroxide particles such as magnesium hydroxide, aluminum hydroxide, calcium hydroxide, chromium hydroxide, zirconium hydroxide, cerium hydroxide, nickel hydroxide, and boron hydroxide; metal oxide particles such as magnesium oxide, alumina ($Al_2O_3$), boehmite (alumina monohydrate), titania ($TiO_2$), silica ($SiO_2$), zirconia ($ZrO_2$), barium titanate ($BaTiO_3$), and zinc oxide; metal carbonate particles such as calcium carbonate and magnesium carbonate; metal nitride particles such as magnesium nitride, aluminum nitride, calcium nitride, and titanium nitride; metal fluoride particles such as magnesium fluoride and calcium fluoride; clay mineral particles such as calcium silicate, calcium phosphate, apatite, and talc; and the like. These inorganic fillers may be inorganic fillers surface-modified with a silane coupling agent or the like. These inorganic fillers may be used singly or in combination of two or more kinds thereof.

When the adhesive layer includes the organic filler, examples of the organic filler include particles of a cross-linked polymer such as crosslinked poly (meth)acrylic acid, crosslinked poly (meth)acrylate, crosslinked polysilicone, crosslinked polystyrene, crosslinked polydivinylbenzene, a styrene-divinylbenzene copolymer crosslinked product, a melamine resin, a phenol resin, or a benzoguanamine-formaldehyde condensate; and particles of a heat resistant polymer such as polysulfone, polyacrylonitrile, aramid, or polyacetal. These organic fillers may be used singly or in combination of two or more kinds thereof.

Examples of the separator having an adhesive layer include: a separator having heat resistant porous layers on both sides of a porous substrate and an adhesive layer on each of both heat resistant porous layers; a separator having heat resistant porous layers on both sides of a porous substrate and an adhesive layer on one of the heat resistant porous layers; a separator having a heat resistant porous layer on one side of a porous substrate and an adhesive layer on the other side of the porous substrate; a separator having a heat resistant porous layer on one side of a porous substrate and an adhesive layer on the heat resistant porous layer; and a separator having a heat resistant porous layer on one side of a porous substrate and an adhesive layer on the other side of the porous substrate and on the heat resistant porous layer.

[Characteristics of Separator]

The thickness of the separator is preferably 8 μm or more, more preferably 10 μm or more, and still more preferably 12 μm or more from the viewpoint of the mechanical strength of the separator, and is preferably 25 μm or less, more preferably 22 μm or less, and still more preferably 20 μm or less from the viewpoint of the energy density of the battery.

The piercing strength of the separator is preferably from 150 gf to 1000 gf, and more preferably from 200 gf to 600 gf from the viewpoint of the mechanical strength of the separator or the short circuit resistance of the battery. The method of measuring the piercing strength of the separator is the same as the method of measuring the piercing strength of the porous substrate.

The porosity of the separator is preferably from 30% to 70%, more preferably from 35% to 65%, and still more preferably from 40% to 60%, from the viewpoint of the adhesiveness to the electrode, the handleability of the separator, the ion permeability, or the mechanical strength.

The Gurley value (JIS P8117: 2009) of the separator is preferably from 80 sec/100 mL to 400 sec/100 mL, more preferably from 120 sec/100 mL to 300 sec/100 mL, and still more preferably from 150 sec/100 mL to 250 sec/100 mL from the viewpoint of mechanical strength and ion permeability of the separator.

The separator has an area shrinkage ratio, when heated at 135° C. for 1 hour, of preferably 30% or less, more preferably 20% or less, still more preferably 15% or less, and further still more preferably 11% or less.

The separator has an area shrinkage ratio, when heated at 150° C. for 1 hour, of preferably 45% or less, more preferably 30% or less, still more preferably 20% or less.

The area shrinkage ratio when the separator is heated at 135° C. or 150° C. for one hour is determined by the following measuring method.

The separator is cut out into a rectangle of 180 mm in an MD direction and 60 mm in a TD direction to prepare a test piece. This test piece is marked at points of 20 mm and 170 mm from one end on a line bisecting the test piece in the TD direction (referred to as points A and B, respectively). Furthermore, the test piece is marked at points of 10 mm and 50 mm from one end on a line bisecting the test piece in the MD direction (referred to as points C and D, respectively). A clip is attached to the marked test piece (a point where the clip is attached is between the point A and an end closest to the point A). The test piece is hung in an oven in which the temperature is adjusted to 135° C. or 150° C. to be heated under no tension for one hour. A length between A and B and a length between C and D are measured before and after the heat treatment, and an area shrinkage ratio is calculated by the following formula.

Area shrinkage ratio (%)={1−(length between $A$ and $B$ after heat treatment÷length between $A$ and $B$ before heat treatment)×(length between $C$ and $D$ after heat treatment÷length between $C$ and $D$ before heat treatment)}×100

The area shrinkage ratio when the separator is heat-treated can be controlled by the volume ratio of barium sulfate particles in the heat resistant porous layer, the thickness of the heat resistant porous layer, the porosity of the heat resistant porous layer, and the like.

[Method of Producing Separator]

The separator can be produced, for example, by forming the heat resistant porous layer on the porous substrate by a wet coating method or a dry coating method. In the disclosure, the wet coating method is a method of solidifying a coating layer in a coagulation liquid, and the dry coating method is a method of drying a coating layer to solidify the coating layer. Hereinafter, embodiment examples of the wet coating method will be described.

The wet coating method is a method of applying a coating liquid containing a heat resistant resin and barium sulfate particles onto a porous substrate, immersing the resulting product in a coagulation liquid to solidify the coating layer, pulling the resulting product out of the coagulation liquid, washing the resulting product with water, and drying the resulting product.

The coating liquid for forming the heat resistant porous layer is prepared by dissolving or dispersing a heat resistant resin and barium sulfate particles in a solvent. In the coating liquid, a component other than the heat resistant resin and the inorganic particles is dissolved or dispersed, if necessary.

A solvent used for preparing the coating liquid includes a solvent that dissolves the heat resistant resin (hereinafter, also referred to as "good solvent"). Examples of the good solvent include a polar amide solvent such as N-methylpyrrolidone, dimethylacetamide, or dimethylformamide.

The solvent used for preparing the coating liquid preferably contains a phase separation agent that induces phase separation from the viewpoint of forming a porous layer having a favorable porous structure. Therefore, the solvent used for preparing the coating liquid is preferably a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

In a case in which the solvent used for preparing the coating liquid is a mixed solvent of a good solvent and a phase separation agent, the mixed solvent preferably contains 60% by mass or more of the good solvent and from 5% by mass to 40% by mass of the phase separation agent from the viewpoint of forming a favorable porous structure.

The resin concentration of the coating liquid is preferably from 1% by mass to 20% by mass from the viewpoint of forming a favorable porous structure. The inorganic particles concentration of the coating liquid is preferably from 0.5% by mass to 50% by mass from the viewpoint of forming a favorable porous structure.

The coating liquid may contain a dispersant such as a surfactant, a wetting agent, an antifoaming agent, or a pH adjuster. These additives may be those remain in the heat resistant porous layer as long as the additives are electrochemically stable in the range of use of a non-aqueous secondary battery and do not inhibit the reaction in the battery.

Examples of a means of applying the coating liquid to the porous substrate include a Meyer bar, a die coater, a reverse roll coater, a roll coater, and a gravure coater. In a case where the heat resistant porous layers are formed on both sides of the porous substrate, it is preferable to simultaneously apply the coating liquid to both sides of the porous substrate from the viewpoint of productivity.

The coating layer is solidified by immersing the porous substrate on which the coating layer is formed in a coagulation liquid, and solidifying the resin while phase separation is induced in the coating layer. As a result, a laminated body composed of the porous substrate and the heat resistant porous layer is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure and productivity. The temperature of the coagulation liquid is, for example, from 20° C. to 50° C.

After the coating layer is solidified in the coagulation liquid, the laminated body is pulled out of the coagulation liquid and washed with water. By washing the laminated body with water, the coagulation liquid is removed from the laminated body. Furthermore, by drying the laminated body, water is removed from the laminated body. Washing with water is performed, for example, by transporting the laminated body in a water washing bath. Drying is performed, for example, by transporting the laminated body in a high-temperature environment, blowing air to the laminated body, or bringing the laminated body into contact with a heat roll. The drying temperature is preferably from 40° C. to 80° C.

The separator of the disclosure can also be produced by a dry coating method. The dry coating method is a method of applying a coating liquid onto a porous substrate, drying the coating layer to remove a solvent by evaporation, and thereby forming a heat resistant porous layer on the porous substrate.

The separator of the disclosure can also be produced by a method of preparing a heat resistant porous layer as an independent sheet, stacking the heat resistant porous layer on a porous substrate, and forming a composite by thermal press bonding or an adhesive. Examples of the method of preparing a heat resistant porous layer as an independent sheet include a method of forming a heat resistant porous layer on a release sheet by applying the above-described wet coating method or dry coating method.

When the separator of the disclosure has an adhesive layer, the adhesive layer can be formed by a wet coating method or a dry coating method. The wet coating method of the adhesive layer is the same method as the wet coating method of the heat resistant porous layer. The dry coating method of the adhesive layer may be the same method as the dry coating method of the heat resistant porous layer, or may be a method of applying and drying the aqueous dispersion containing the constituent material. The adhesive layer formed on the release sheet may be superimposed on the porous substrate or the heat resistant porous layer, and may be composited by thermocompression bonding or an adhesive.

The adhesive layer can be formed after the heat resistant porous layer is formed on the porous substrate. Alternatively, the adhesive layer may be provided on one surface of the porous substrate, and then the heat resistant porous layer may be formed on the other surface of the porous substrate. Alternatively, the heat resistant porous layer and the adhesive layer may be simultaneously formed on the porous substrate by applying a plurality of kinds of coating liquids on the porous substrate.

<Non-Aqueous Secondary Battery>

A non-aqueous secondary battery of the disclosure is a non-aqueous secondary battery that obtains an electromotive force by doping and dedoping lithium ion, and includes a positive electrode, a negative electrode, and a separator for a non-aqueous secondary battery of the disclosure. The doping means occlusion, support, adsorption, or insertion, and means a phenomenon that lithium ions enter an active material of an electrode such as a positive electrode.

The non-aqueous secondary battery of the disclosure has a structure in which, for example, a battery element in which a negative electrode and a positive electrode face each other with a separator interposed therebetween is enclosed in an exterior material together with an electrolytic solution. The non-aqueous secondary battery of the disclosure is suitable for a non-aqueous electrolyte secondary battery, particularly for a lithium ion secondary battery.

Hereinafter, aspect examples of the positive electrode, negative electrode, electrolyte solution, and exterior material included in the non-aqueous secondary battery according to the disclosure will be described.

Examples of an embodiment of the positive electrode include a structure in which an active material layer containing a positive electrode active material and a binder resin is formed on a current collector. The active material layer may further contain a conductive auxiliary agent. Examples of the positive electrode active material include a lithium-containing transition metal oxide, and specific examples thereof include $LiCoO_2$, $LiNiO_2$, $LiMn_{1/2}Ni_{1/2})_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAli_{1/4}Ni_{3/4}O_2$. Examples of the binder resin include a polyvinylidene fluoride type resin, and a styrene-butadiene copolymer. Examples of the conductive auxiliary agent include carbon materials such as acetylene black, Ketjen black, and graphite powder. Examples of the current collector include an aluminum foil, a titanium foil, and a stainless steel foil, each having a thickness of from 5 μm to 20 μm.

Examples of an embodiment of the negative electrode include a structure in which an active material layer containing a negative electrode active material and a binder resin is formed on a current collector. The active material layer may further contain a conductive auxiliary agent. Examples of the negative electrode active material include materials capable of electrochemically occluding lithium ion. Specific examples thereof include carbon materials; and alloys of lithium in combination with silicon, tin, aluminum; wood's alloy, or the like. Examples of the binder resin include a polyvinylidene fluoride type resin and a styrene-butadiene copolymer. Examples of the conductive auxiliary agent include carbon materials such as acetylene black, Ketjen black, graphite powder, and extra fine carbon fiber. Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination. As the electrolyte solution, a solution is preferred, which is obtained by mixing a cyclic carbonate and a chain carbonate at a mass ratio (cyclic carbonate:chain carbonate) of from 20:80 to 40:60, and dissolving a lithium salt therein to give a concentration of from 0.5 mol/L to 1.5 mol/L.

Examples of the exterior material include a metal can and an aluminum laminated film pack. The shape of the battery may be a square shape, a cylindrical shape, a coin shape, and the like, but the separator of the disclosure is suitable for any one of these shapes.

The non-aqueous secondary battery of the disclosure can be manufactured, for example, by any one of the following (1) to (3) using a laminate after the laminate in which the separator of the disclosure is disposed between the positive electrode and the negative electrode is manufactured. Hereinafter, performing the hot press treatment by impregnating the separator with the electrolytic solution is referred to as "wet heat press", and performing the hot press treatment without impregnating the separator with the electrolytic solution is referred to as "dry heat press."

(1) After the electrode and the separator are bonded to each other by hot press (dry heat press) on the laminate, the exterior member (for example, a pack made of an aluminum laminate film. Same as below), the electrolytic solution is injected into the container member, the inside of the container member is brought into a vacuum state, and then the laminate is further heat-pressed (wet heat press) from above the container member, thereby performing the bonding of the electrode and the separator, and the sealing of the container member.

(2) The laminate is housed in the exterior material, the electrolytic solution is injected into the exterior material, the inside of the exterior material is brought into the vacuum state, and then the laminate is heat-pressed (wet heat press) from above the exterior material, thereby performing the bonding of the electrode and the separator and the sealing of the exterior material.

(3) After the electrode and the separator are bonded to each other by the hot press (dry heat press) on the laminate, the laminate is housed in the exterior material, the electrolytic solution is injected into the exterior material, the inside of the exterior material is brought into the vacuum state, and then the exterior material is sealed.

As the conditions for the wet heat press in the above manufacturing methods, the press temperature is preferably from 70° C. to 110° C. and the press pressure is preferably from 0.5 MPa to 2 MPa. As the conditions for the dry heat press in the above manufacturing methods, the press temperature is preferably from 20° C. to 100° C. and the press pressure is preferably from 0.5 MPa to 9 MPa. The press time is preferably controlled in accordance with the press temperature and press pressure, and the press time is controlled, for example, in the range of from 0.5 minute to 60 minutes.

When the laminate in which the separator is disposed between the positive electrode and the negative electrode is manufactured, the method of disposing a separator between a positive electrode and a negative electrode may be a method of laminating at least one positive electrode, one separator, and one negative electrode in this order (so-called stack method), or may be a method of laminating a positive electrode, a separator, a negative electrode, and a separator in this order and winding the positive electrode, the separator, the negative electrode, and the separator in a length direction.

EXAMPLES

Hereinafter, the separator and the non-aqueous secondary battery of the disclosure will be described more specifically with reference to Examples. Materials, used amounts, ratios, treatment procedures, and the like illustrated in the following Examples can be changed, if appropriate without departing from the spirit of the disclosure. Therefore, the range of the separator and the non-aqueous secondary battery of the disclosure should not be construed as being limited by the specific examples described below.

<Measurement Method and Evaluation Method>

The measurement methods and evaluation methods applied in the examples of the invention and comparative examples are as follows.

[Average Primary Particle Size of Barium Sulfate Particles]

The barium sulfate particles before addition to the coating liquid for forming the heat resistant porous layer were used as a sample, and the major axes of 100 randomly selected particles were measured by observation with a scanning electron microscope (SEM). An average value thereof was calculated and defined as the average primary particle size (μm) of the barium sulfate particles. The magnification of the SEM was from 50,000 to 300,000.

[Content of Barium Sulfate Particles]

From the amounts and true densities of the barium sulfate particles and the heat resistant resin used in the coating liquid for forming the heat resistant porous layer, the volume ratio Va (volume %) of the barium sulfate particles was obtained by the following formula.

$$Va=\{(Xa/Da)/(Xa/Da+Xb/db)\}\times100$$

Here, the barium sulfate particles are a, the heat resistant resin is b, the amounts of respective constituent materials used are Xa and Xb (g), and the true densities of respective constituent materials are Da and db (g/cm³).

[Thickness of Porous Substrate and Separator]

The thicknesses (μm) of the porous substrate and the separator were determined by measuring 20 points within a 10 cm square using a contact type thickness meter (Mitutoyo Corporation, LITEMATIC VL-50S) and averaging the measured values. The measurement terminal used was a spherical surface terminal with a radius of the sphere of 10 mm (Mitutoyo Corporation, measurement terminal with carbide spherical surface, φ 10.5), and was adjusted so that a load of 0.19 N was applied during the measurement.

[Thickness of Heat Resistant Porous Layer]

The thickness (total thickness thereof on both sides: μm) of the heat resistant porous layer was determined by subtracting the thickness (μm) of the porous substrate from the thickness (μm) of the separator.

[Mass of Heat Resistant Porous Layer]

The separator was cut into a size of 10 cm×10 cm, the mass thereof was measured, and the mass was divided by the area thereof to determine the basis weight (g/m²) of the separator. The porous substrate used for producing the separator was cut into a size of 10 cm×10 cm, the mass thereof was measured, and the mass was divided by the area thereof to determine the basis weight (g/m²) of the porous substrate. The basis weight of the porous substrate was subtracted from the basis weight of the separator to determine the mass of the heat resistant porous layer per unit area (total mass thereof on both sides, g/m²).

[Porosity of Porous Substrate]

The porosity ε (%) of the porous substrate was determined by the following formula.

$$\varepsilon=\{1-Ws/(ds\cdot t)\}\times100$$

In the formula, Ws represents basis weight of porous substrate (g/m²), ds represents true density of porous substrate (g/cm³), and t represents thickness of porous substrate (μm).

[Porosity of Heat Resistant Porous Layer]

The porosity ε (%) of the heat resistant porous layer was determined by the following formula.

$$\varepsilon=\{1-(Wa/da+Wb/db+Wc/dc+\ldots+Wn/dn)/t\}\times100$$

Here, the constituent materials of the heat resistant porous layer are represented by a, b, c, . . . , n, the mass per unit area of each constituent material is Wa, Wb, We, . . . , or Wn (g/cm²), the true density of each constituent material is represented by da, db, dc, . . . , or do (g/cm³), and the thickness of the heat resistant porous layer is represented by t (cm).

[Gurley Value]

The Gurley value (sec/100 mL) of each of the porous substrate and the separator was measured with a Gurley type densometer (G-B2C, manufactured by Toyo Seiki Seisaku-sho, Ltd.) in accordance with JIS P8117 (2009).

[Peel Strength Between Porous Substrate and Heat Resistant Porous Layer]

A T-shaped peel test was performed on the separator. Specifically, a pressure-sensitive adhesive tape (Manufactured by 3M Company, #550, width: 12 mm) was attached to one side of the separator (when the pressure-sensitive adhesive tape was attached, the length direction of the pressure-sensitive adhesive tape was matched with the MD direction of the separator), and the separator was cut out together with the pressure-sensitive adhesive tape into a rectangle of 70 mm in the MD direction and 12 mm in the TD direction. The pressure-sensitive adhesive tape was slightly peeled off together with the heat resistant porous layer immediately below. Two separated ends were held by Tensilon (Orientec Co., Ltd., RTC-1210A), and a T-peel test was performed. Note that the pressure-sensitive adhesive tape was used as a support for peeling off the heat resistant porous layer from the porous substrate. The tensile speed of the T-peel test was 300 mm/min. A load (N/12 mm) from 10 mm to 40 mm after start of measurement was sampled at 0.4 mm intervals, and an average thereof was calculated. Furthermore, the loads of ten test pieces (N/12 mm) were averaged.

[Area Shrinkage Ratio by Heat Treatment]

The separator was cut out into a rectangle of 180 mm in an MD direction and 60 mm in a TD direction to prepare a test piece. This test piece was marked at points of 20 mm and 170 mm from one end on a line bisecting the test piece in the TD direction (referred to as points A and B, respectively). Furthermore, the test piece was marked at points of 10 mm and 50 mm from one end on a line bisecting the test piece in the MD direction (referred to as points C and D, respectively). A clip was attached to the marked test piece (a point where the clip was attached is between the point A and an end closest to the point A). The test piece was hung in an oven in which the temperature is adjusted to 135° C. or 150° C. to be heated under no tension for one hour. A length between A and B and a length between C and D were measured before and after the heat treatment, and an area shrinkage ratio was calculated by the following formula. Furthermore, the area shrinkage ratios of the ten test pieces were averaged.

Area shrinkage ratio (%)={1−(length between $A$ and $B$ after heat treatment÷length between $A$ and $B$ before heat treatment)×(length between $C$ and $D$ after heat treatment÷length between $C$ and $D$ before heat treatment)}×100

[Spot Heating Test (Wet Spot Heating Test) in Presence of Electrolytic Solution]

The separator was cut into a size of 50 mm in the MD direction×50 mm in the TD direction to prepare a test piece. The test piece was impregnated with the electrolytic solution for 1 minute and then taken out, and the excess electrolytic solution was wiped off. As the electrolytic solution, 1 mol/L LiBF$_4$-ethylene carbonate:ethyl methyl carbonate (volume ratio 3:7) was used.

The test piece after impregnation with the electrolytic solution was placed on a horizontal table, and the tip of a soldering iron was brought into point contact with the surface of the separator for 60 seconds in a state where the tip temperature was set to 260° C. or 400° C. by heating the soldering iron having a tip diameter of 2 mm. The area (mm$^2$) of the holes generated in the separator by the point contact was measured, and the areas of the holes of 10 test pieces were averaged. As the heat resistance of the separator is higher, the area of the holes generated in the separator is smaller.

<Manufacturing of Separator>

Example 1

As a material of the heat resistant porous layer, a meta-wholly aromatic polyamide (trade name: CONEX (manufactured by Teijin Limited)) and barium sulfate particles were prepared. These physical properties are as shown in Table 1.

The meta-wholly aromatic polyamide was dissolved in dimethylacetamide (DMAc) so as to have a resin concentration of 6.5% by mass, and barium sulfate particles were further stirred and mixed to obtain a coating liquid (1).

An appropriate amount of coating liquid (1) was placed on a Meyer bar, and the coating liquid (1) was applied to both sides of a polyethylene microporous membrane (thickness: 10 μm porosity: 48%, Gurley value: 72 seconds/100 mL). At that time, the coating was performed so that the coating amount on the front and back of the polyethylene microporous membrane was equal. This was immersed in a coagulation liquid (DMAc:water=50:50 [mass ratio], liquid temperature 40° C.) to solidify the coating layer, then washed in a water washing tank having a water temperature of 40° C., and dried. In this way, the separator in which the heat resistant porous layer was formed on both sides of the polyethylene microporous film was obtained.

Examples 2 to 8 and Comparative Examples 1 to 4

Each separator was manufactured in the same manner as in Example 1 except that the particle diameter of barium sulfate particles contained in the heat resistant porous layer and/or the volume ratio of barium sulfate particles are changed to the specifications shown in Table 1.

Example 9

A separator was manufactured in the same manner as in Example 1 except that the meta-wholly aromatic polyamide contained in the heat resistant porous layer was changed to the para-wholly aromatic polyamide (trade name: TECHNORA (manufactured by Teijin Limited)).

Example 10

A separator was manufactured in the same manner as in Example 1 except that the meta-wholly aromatic polyamide contained in the heat resistant porous layer was changed to polyamideimide (trade name: 4000 T HV (manufactured by Solvay)).

The composition, physical properties, and evaluation results of each separator of Examples 1 to 10 and Comparative Examples 1 to 4 are shown in Table 1 The meta-wholly aromatic polyamide used for forming the heat resistant porous layer is described as "meta-aramid" in Table 1.

The para-wholly aromatic polyamide used for the formation of the heat resistant porous layer in Example 9 is described as "para-aramid" in Table 1.

The polyamide of Example 10 used for the formation of the heat resistant porous layer is described as "PAI" in Table 1.

TABLE 1

| | Heat resistant resin | Inorganic particle | | | | Thickness (sum of both sides) | Mass (sum of both surfaces) | Porosity | Separator | | | Area shrinkage ratio | |
|---|---|---|---|---|---|---|---|---|---|---|---|---|---|
| | | | Average primary particle size | Content | Coating | | | | Thickness | Gurley value | Peel strength | 135° C. | 150° C. |
| | Type — | Type — | size μm | % by volume | — | both sides μm | g/m² | % | ness μm | Sec/100 mL | N/12 mm | % | % |
| Comparative Example 1 | Meta-aramid | BaSO₄ | 0.05 | 35 | Both sides | 4 | 3.4 | 67 | 15 | 145 | 0.23 | 8 | 12 |
| Example 2 | Meta-aramid | BaSO₄ | 0.05 | 29 | Both sides | 4 | 4.7 | 51 | 15 | 158 | 0.53 | 7 | 11 |
| Example 3 | Meta-aramid | BaSO₄ | 0.05 | 25 | Both sides | 4 | 4.3 | 48 | 14 | 188 | 0.58 | 7 | 12 |
| Example 4 | Meta-aramid | BaSO₄ | 0.05 | 20 | Both sides | 4 | 4.5 | 44 | 14 | 187 | 0.68 | 7 | 13 |
| Example 1 | Meta-aramid | BaSO₄ | 0.05 | 17 | Both sides | 4 | 4.1 | 51 | 15 | 161 | 0.66 | 7 | 11 |
| Example 5 | Meta-aramid | BaSO₄ | 0.05 | 10 | Both sides | 4 | 3.6 | 50 | 15 | 181 | 0.79 | 7 | 15 |
| Example 6 | Meta-aramid | BaSO₄ | 0.05 | 5 | Both sides | 4 | 3.9 | 41 | 15 | 230 | 0.76 | 10 | 19 |
| Comparative Example 2 | Meta-aramid | BaSO₄ | 0.05 | 3 | Both sides | 4 | 3.4 | 45 | 15 | 201 | 0.84 | 15 | 30 |
| Example 7 | Meta-aramid | BaSO₄ | 0.10 | 17 | Both sides | 4 | 4.2 | 49 | 15 | 167 | 0.71 | 8 | 14 |
| Example 8 | Meta-aramid | BaSO₄ | 0.25 | 17 | Both sides | 4 | 4.2 | 49 | 15 | 162 | 0.76 | 8 | 17 |
| Example 9 | Para-aramid | BaSO₄ | 0.05 | 17 | Both sides | 4 | 3.5 | 59 | 15 | 162 | 0.70 | 6 | 8 |
| Example 10 | PAI | BaSO₄ | 0.05 | 17 | Both sides | 4 | 3.2 | 60 | 15 | 109 | 0.68 | 7 | 11 |
| Comparative Example 3 | Meta-aramid | BaSO₄ | 0.30 | 17 | Both sides | 4 | 3.6 | 53 | 15 | 165 | 0.41 | 16 | 32 |
| Comparative Example 4 | Meta-aramid | BaSO₄ | 0.50 | 17 | Both sides | 4 | 4.1 | 51 | 15 | 163 | 0.46 | 17 | 34 |

The separators of Comparative Example 1, Example 1, and Example 9 were subjected to a wet spot heating test. In the case of the separator of Comparative Example 1, the pore areas in the tests at 260° C. and 400° C. were 8.6 mm² and 14.0 mm², respectively. In the case of the separator of Example 1, the pore areas were 4.3 mm² and 11.9 mm², respectively, which were smaller than those of Comparative Example 1. In the case of the separator of Example 9, the pore areas were 0 mm² and 0 mm², respectively, and no hole was open.

Example 11

An adhesive layer was provided on both sides of the separator of Example 1 by the following method to manufacture the separator of Example 11.

An aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 70:30 was prepared. An equal amount of the aqueous dispersion was applied to both surfaces of the separator through the separator of Example 1 between a pair of bar coaters on which an appropriate amount of the aqueous dispersion was placed, and then dried. In this way, a separator in which a heat resistant porous layer and an adhesive layer were formed on both surfaces of a polyethylene microporous membrane was obtained.

Example 12

An adhesive layer was provided on both sides of the separator of Example 9 by the same manner as in Example 11 to manufacture the separator of Example 12.

Example 13

An adhesive layer was provided on both sides of the separator of Example 10 by the same manner as in Example 11 to manufacture the separator of Example 13.

For the separator of Example 1 and the separator of Example 11 to 13, the adhesive strength to the electrode was measured. The separator of Example 11 to 13 had higher adhesive strength to the electrode than the separator of Example 1. The electrode and the measurement method used for measuring the adhesive strength to the electrode are as follows.

—Manufacture of Positive Electrode—

94 parts by mass of lithium cobalt oxide powder, 3 parts by mass of acetylene black, 3 parts by mass of a polyvinylidene fluoride resin, and an appropriate amount of N-methyl-2 pyrrolidone were kneaded by a double arm mixer to prepare a slurry having a polyvinylidene fluoride resin concentration of 5% by mass. This slurry was applied to one side of an aluminum foil having a thickness of 20 μm, dried, and then pressed to obtain a positive electrode.

—Manufacture of Negative Electrode—

300 parts by mass of artificial graphite, 7.5 parts by mass of an aqueous dispersion containing 40% by mass of a modified product of a styrene-butadiene copolymer, 3 parts by mass of carboxymethyl cellulose, and an appropriate amount of water were kneaded by a double arm mixer to prepare a slurry. This slurry was applied to one side of a copper foil having a thickness of 10 μm, dried, and then pressed to obtain a negative electrode.

The positive electrode and the negative electrode were each cut into a rectangle of 70 mm and 15 mm, and the separator was cut into a rectangle of MD 72 mm and TD 18 mm. The positive electrode, the separator, and the negative electrode were stacked in this order, and the electrode and the separator were bonded to each other by hot pressing (85° C., 1 MPa, 30 sec) to obtain a test piece.

The test piece was fixed to a lower chuck of Tensilon (A & D Company, STB-1225 S). In this case, the test piece was fixed to Tensilon such that the length direction of the test piece (that is, MD of the separator) was the gravity direction. The positive electrode was peeled off from the separator by about 2 cm from the lower end, the end was fixed to the upper chuck, and a 180° peeling test was performed. The tensile speed in the 180° peel test was set to 300 mm/min, and a load (N) from 10 mm to 40 mm after the start of the measurement was taken at 0.4 mm intervals, thereby calculating the average thereof. Further, the loads of the three test pieces were averaged to determine the adhesive strength (N/15 mm) between the electrode and the separator.

The disclosure of Japanese Patent Application No. 2020-130639 filed on Jul. 31, 2020 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, the separator comprising:
   a porous substrate; and
   a heat resistant porous layer that is provided on one side or on both sides of the porous substrate, and that contains a heat resistant resin and barium sulfate particles,
   wherein an average primary particle size of the barium sulfate particles contained in the heat resistant porous layer is from 0.01 μm to less than 0.30 μm, and
   wherein a volume ratio of the barium sulfate particles in a solid content portion of the heat resistant porous layer is from 5% by volume to 29% by volume, and wherein a volume ratio of the heat resistant resin in a solid content portion of the heat resistant porous layer is from 71% by volume to 95% by volume.

2. The separator for a non-aqueous secondary battery according to claim 1, wherein the volume ratio of the barium sulfate particles in the solid content portion of the heat resistant porous layer is from 5% by volume to less than 27% by volume.

3. The separator for a non-aqueous secondary battery according to claim 1, wherein the heat resistant resin contains at least one selected from the group consisting of wholly aromatic polyamide, polyamide imide, poly-N-vinylacetamide, polyacrylamide, copolymerized polyether polyamide, polyimide and polyether imide.

4. The separator for a non-aqueous secondary battery according to claim 1, wherein a peeling strength between the porous substrate and the heat resistant porous layer is 0.30 N/12 mm or more.

5. The separator for a non-aqueous secondary battery according to claim 1, wherein an area shrinkage ratio of the separator for the non-aqueous secondary battery, when heated at 135° C. for 1 hour, is 30% or less.

6. The separator for a non-aqueous secondary battery according to claim 1, wherein an area shrinkage ratio of the separator for the non-aqueous secondary battery, when heated at 150° C. for 1 hour, is 45% or less.

7. The separator for a non-aqueous secondary battery according to claim 1, wherein a porosity of the heat resistant porous layer is from 30% to 70%.

8. The separator for a non-aqueous secondary battery according to claim 1, wherein a weight per unit area of the heat resistant porous layer as a total of both sides is from 1.0 $g/m^2$ to 30.0 $g/m^2$.

9. The separator for a non-aqueous secondary battery according to claim 1, wherein the separator for a non-aqueous secondary battery further comprises an adhesive layer, as an outermost layer, on one side or on both sides of the separator.

10. A non-aqueous secondary battery that obtains electromotive force by lithium doping and dedoping, the non-aqueous secondary battery comprising:
   a positive electrode;
   a negative electrode; and
   the separator for a non-aqueous secondary battery according to claim 1, the separator being disposed between the positive electrode and the negative electrode.

* * * * *